United States Patent [19]

Gernhardt

[11] 4,069,448
[45] Jan. 17, 1978

[54] THREADED FASTENER MOUNTING MEANS

[75] Inventor: Paul D. Gernhardt, Cedar Falls, Iowa

[73] Assignee: Slater Electric Inc., Glen Cove, N.Y.

[21] Appl. No.: 711,146

[22] Filed: Aug. 3, 1976

Related U.S. Application Data

[63] Continuation-in-part of Ser. No. 624,044, Oct. 20, 1975, abandoned.

[51] Int. Cl.² .......................... H02G 3/08; F16B 37/02
[52] U.S. Cl. .......................................... 220/3.2; 85/36;
151/41.75; 174/58; 220/3.6
[58] Field of Search .................... 151/41.73, 41.75, 20;
85/36; 220/3.2, 3.5, 3.6; 174/53, 54, 58;
248/DIG. 6

[56] References Cited

U.S. PATENT DOCUMENTS

| | | | |
|---|---|---|---|
| 1,123,635 | 1/1915 | White | 85/36 X |
| 2,128,725 | 8/1938 | Churchill | 85/36 X |
| 2,149,719 | 3/1939 | Arnest | 220/3.4 |
| 2,180,929 | 11/1939 | Murphy | 85/36 X |
| 2,326,261 | 8/1943 | Shippee et al. | 151/20 |
| 3,297,072 | 1/1967 | Galer | 151/41.73 |
| 3,614,144 | 10/1971 | Hodges | 220/3.6 X |
| 3,659,037 | 4/1972 | MacDonald | 248/DIG. 6 X |
| 3,730,466 | 5/1973 | Swanquist | 248/DIG. 6 X |
| 3,876,821 | 4/1975 | Pringle | 85/36 X |
| 3,895,732 | 7/1975 | Robinson et al. | 220/3.5 |
| 3,952,475 | 4/1976 | Paskert | 151/41.75 |
| 3,955,463 | 6/1976 | Hoehn | 174/53 |

FOREIGN PATENT DOCUMENTS

| | | | |
|---|---|---|---|
| A51,264 | 11/1941 | France | 85/36 |
| 1,102,499 | 3/1961 | Germany | 85/36 |
| 1,204,338 | 9/1970 | United Kingdom | 151/41.75 |

Primary Examiner—Marion Parsons, Jr.
Assistant Examiner—Thomas J. Holko
Attorney, Agent, or Firm—Morgan, Finnegan, Pine, Foley & Lee

[57] ABSTRACT

A threaded fastener quick-fastening clip member is adapted to be slidably lockably engaged in a slotted channel adjacent a lug which is formed with an unthreaded borehole communicating the front face of the structure with the channel. A first leg portion of the clip member is inserted in slot means formed in the channel and is provided with generally rigid but resilient detent means for lockable engagement therein. A second leg portion, intersecting the first leg at an obtuse angle, extends into the channel and is formed with an aperture for registering with the borehole and engaging a threaded fastener. A canopy may cover a portion of the slotted channel adjacent the lug for providing stop means to prevent over-excursion of the second leg portion of the clip member. A threaded fastener is fastened in the borehole by initially being manually thrust endwise into the borehole without turning, thereby deflecting the second leg portion and engaging two generally opposed edges of the aperture for ratchet-like insertion. The fastener may thereafter be tightened by turning against the aforesaid edges of the aperture and may be unfastened only by reverse turning of the fastener in conventional manner.

40 Claims, 7 Drawing Figures

THREADED FASTENER MOUNTING MEANS

This is a continuation-in-part of application Ser. No. 624,044, filed Oct. 20, 1975, now abandoned.

BACKGROUND AND OBJECTS OF THE INVENTION

The present invention relates generally to threaded fastener means and more particularly to certain new and useful improvements in the quick mounting of such fasteners to moldable structures, such as injection molded electrical assembly boxes, made of a non-metallic or plastic material.

In residential, commercial and apartment construction, it is often desirable to utilize various relatively light, load-bearing structures, such as electrical assembly boxes, including electrical junction boxes or electrical outlet boxes, for conveniently mounting outlet receptacles, switches and the like to walls or ceilings. It is therefore desirable to design such structures for inexpensive and relatively simple fabrication by modern injection molding techniques with non-metallic or plastic materials. However, disadvantages are encountered where it is necessary to mount receptacles, switches or other devices to such structures with threaded fasteners. In order to provide suitable means for engaging such threaded fasteners, integral with the mounting structure, it would necessitate either a relatively complicated and expensive molding operation or an inconvenient second tapping operation to form a threaded borehole or the like.

In addition, it has been found that by providing internal plastic threads in such structures, performance has been unsatisfactory since the threads tend to be easily "stripped", rendering the entire structure completely useless. This is of particular importance where it is anticipated that the threaded fastener may be repeatedly removed from and re-threaded into the borehole, such as in electrical assembly boxes, since, during installation, the electrician may have to insert and remove the threaded fastener several times for complete and proper installation of the receptacle, switch, etc. Moreover, during the useful life of the box, the fasteners may be removed several times for replacement of malfunctioning parts. Furthermore, since electrical assembly boxes, especially the threaded fastener mounting portions thereof, tend to be mounted to beams, etc., where access is limited, the initial seating required, as well as complete turning down of the screw may prove exasperating and time-consuming for the installer.

Some prior art structures include tubular inserts that are force-fit into pre-molded openings in the box and which include thread engaging portions extending into its interior for engaging the threads of the fastener at substantially one point. However, although such devices have proved adequate for some applications, they may not be sufficiently reliable or strong for certain applications, such as, use in ceiling boxes where the threaded fastener is subjected to constant axial loading.

It is therefore an object of the present invention to provide a new and improved threaded fastener mounting means.

Another object of the invention is to provide a new and improved threaded fastener mounting means which permits threaded fasteners to be quickly and easily mounted to structures made of a moldable plastic material.

It is also an object of the present invention to provide a new and improved fastener mounting means whereby threaded fasteners may be securely and tenaciously fastened to structures made of moldable plastic materials.

It is a further object of the invention to provide a new and improved threaded fastener mounting means capable of engaging a threaded fastener to support a continuous loading.

It is yet another object of the present invention to provide a new and improved threaded fastener means which will not be rendered useless by improper insertion of a threaded fastener.

Objects and advantages of the invention are set forth herein and in part will be appreciated herefrom or may be learned by practice with the invention, the same being realized and attained by means of the structures and combinations pointed out in the appended claims.

The present invention consists in the novel parts, constructions, arrangements, combinations and improvements herein shown and described.

SUMMARY OF THE INVENTION

Briefly described, the threaded fastener mounting means according to the present invention includes boss means formed on a mounting structure made of moldable plastic material and a quick-fastening clip member installed therein for speed mounting and fastening of a threaded fastener to the mounting structure. As preferably embodied, the aforesaid boss means are formed on generally opposed sidewalls of the mounting structure, which, advantageously, may be an electrical assembly box. The boss means includes a lug structure formed on the portion of the sidewall, which is essentially adjacent the front face of the box, and a slotted channel formed in the sidewall just behind the lug. The lug is formed with an unthreaded borehole extending from the front face of the box and opening into the slotted channel, and the channel is formed with slot means, preferably tapered, for receiving the clip member.

Advantageously, the threaded fastener quick-fastening clip member comprises a V-shaped clip adapted to be slidably lockably engaged in the slotted channel. The clip member, advantageously, includes two generally flat leg portions intersecting in a generally obtuse angle. The first leg member, adapted for slidable insertion into the slot means, is provided with detent means for lockable engagement therein and the second leg member is formed with an aperture for engaging the threaded fastener, the aperture being slightly larger in diameter than the cross-sectional area of the threaded fastener as defined by the crests of its threads.

Advantageously, the clip member is mounted in the slot means with the aperture substantially in registration with the borehole and the second leg member oriented such that the dimension of the cross-sectional area projected by the aperture in a plane perpendicular to the axis of the borehole is between the cross-sectional area of the threaded fastener as defined by the crests of the threads and that of the threaded fastener as defined by the roots of the threads. Also advantageously, and as here preferably embodied, the boss means may further include a canopy, substantially continuous with the sidewalls of the mounting structure, which covers at least a portion of the channel adjacent the lug for providing stop means to prevent over-excursion of the second leg portion of the clip member during insertion of the threaded fastener. According to one embodiment, the canopy may include stop means in the form of a projection spaced slightly rearwardly of the back face of the lug and protruding into the channel to abut the free end of the second leg and stop its excursion at a predetermined point. Alternatively, the canopy itself may act as the stop by being positioned relative to the seated clip member such that the free end of the second leg will "run into" its inner wall at a predetermined point.

Further advantageously, and as here preferably embodied, detent means provided on the first leg portion of the clip member may be formed by die stamping the back edge of the first leg portion so as to form barb-like corners of less than 90° and bending the barbs to extend angularly outwardly from the surface of the first leg portion so as to be rearwardly inclined. In addition, the second leg portion is slightly less wide than the first leg portion.

The quick-fastening mounting clip is fully seated in the slotted channel with the intersection of its two leg portions generally abutting the rear face of the lug and the detent means lockably embedded in the slots. Accordingly, a threaded fastener may be inserted into the borehole until further inward axial insertion is resisted by the aforesaid projected cross-sectional area of the aperture. Thereafter, further axial insertion of the fastener, advantageously effected by a moderate force applied through a force-concentrating tool such as a screw driver, urges the second leg portion in the direction of insertion until the cross-sectional area projected by the aperture is increased sufficiently to allow passage of the fastener threads, seriatum, in a ratchet-like manner.

It has been found that, according to the present invention, threaded fasteners may be quickly mounted to a mounting structure made of moldable plastic material for secure fastening therein, such as an electrical assembly box. Moreover, by providing boss means on the mounting structure with a slot-free lug, having only an unthreaded borehole, and a slotted channel in its sidewall, the assembly box may be conveniently fabricated from a relatively simple and inexpensive mold.

It has also been found that by tapering the slots, from the back end of the channel where the clip is initially inserted to point generally near the rear face of the lug where the clip is to be lockably seated, the clip member may be freely receivable therein and properly oriented in its locked position.

In addition, by providing stop means on a canopy covering the channel, over-excursion of the second leg member in the direction of inward axial insertion of the threaded fastener is prevented. Thus, over-bending of the clip member is prohibited, which would otherwise render an assembly box containing the overbent clip completely useless.

By forming the clip member with barbs extending angularly outwardly from the surface of the first leg portion, the detent means may be lockably embedded in the plastic material of the slot, while enabling relatively simple and inexpensive die stamping for fabrication. Furthermore, by forming the second leg portion to a slightly smaller width than that of the first leg portion, the clip member is substantially freely receivable in the channel except as the detent means engage and "bite" into the slots.

It will be understood that the foregoing general description as well, are exemplary and explanatory of the invention, but are not restrictive thereof. Accordingly, the accompanying drawings, referred to herein and constituting a part hereof, illustrate preferred embodiments of the present invention, and together with the description, serve to explain the principles of the invention.

DETAILED DESCRIPTION OF PREFERRED EMBODIMENTS

Figure 2A:
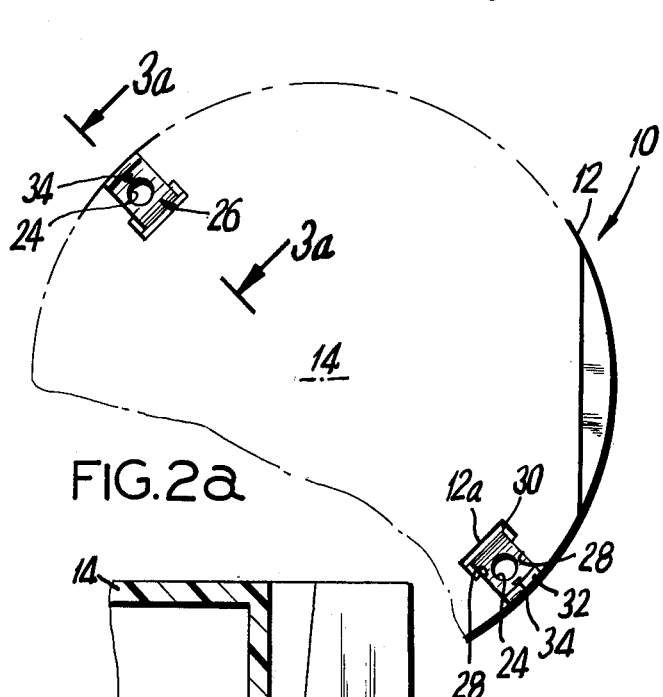
FIGS. 2a and 2b are back views of, respectively, round and rectangularly shaped electrical outlet boxes embodying boss means according to the present invention.
Figure 2B:
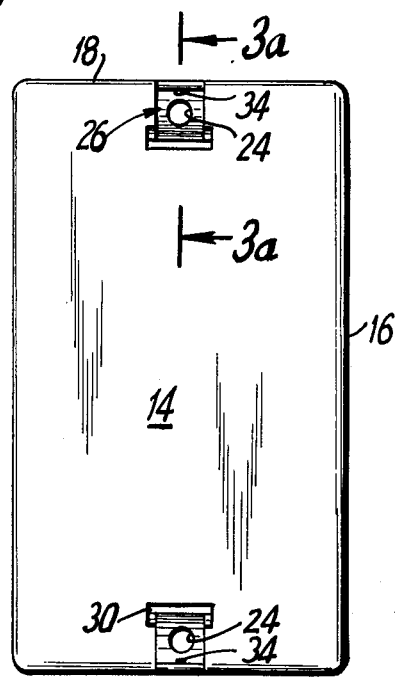

Referring generally to the embodiments of the present invention illustrated in the accompanying drawings, there is shown in FIGS. 2a and 2b a threaded fastener mounting structure, indicated generally by reference numeral 10. Advantageously, mounting structure 10 is an electrical assembly box formed from a moldable plastic material and adapted to receive and support a suitable standard electrical outlet receptacle, switch or the like (not shown) which may be mounted thereto by means of threaded fastener 15. It will be understood that electrical assembly box 10 may be of any conventional shape, and that the two boxes illustrated in FIGS. 2a and 2b - round and rectangular, respectively - are merely illustrative of a mounting structure in which the present invention may be embodied.

In accordance with the embodiment illustrated in FIG. 2a, assembly box 10 is formed with backwall 14 and upstanding continuous sidewall 12, while the box illustrated in FIG. 2b is made up of backwall 14 and upstanding sidewalls 16 and 18 (endwalls). It will be understood that sidewall 12 as well as sidewalls 16 and 18 define a generally open front face to which the electrical receptacle or switch may be mounted. Accordingly, the threaded fastener mounting member (indicated generally as boss means 20) may be formed on generally opposed sidewalls of assembly box 10.

Figure 3A:
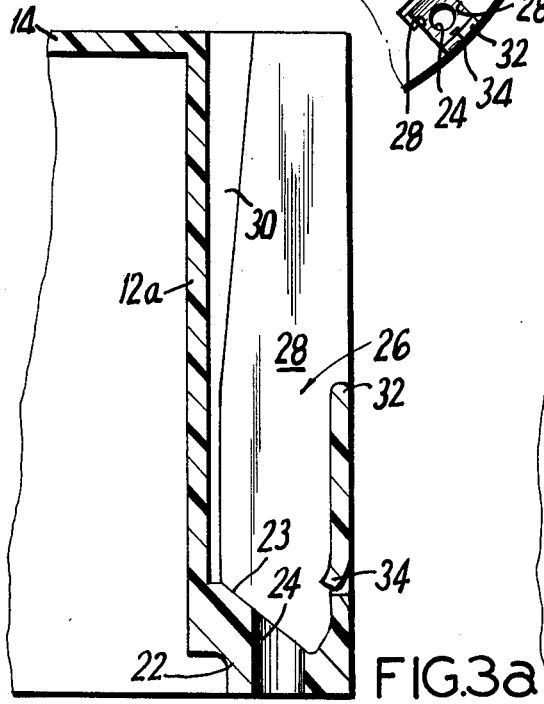
FIG. 3a is a cut-away view of one embodiment of boss means according to the present invention.

Referring now to FIG. 3a, there is shown a sectional view of one embodiment of the threaded fastener mounting member according to the present invention. Accordingly, boss means 20 include lug 22 formed in a sidewall (referred to hereinafter as sidewall 12) of electrical assembly box 18 on the front face thereof. Advantageously, lug 22 is provided with unthreaded borehole 24 which communicates the front face of outlet box 10 with slotted channel 26 which, according to this embodiment of the invention, extends from the rear face of boss 22 to backwall 14. Slotted channel 26 includes sidewall portions 28 and bottom portion 12a. Advantageously, slot means 30 are provided in the sidewall portions 28 for receiving and guiding clip member 50, as hereinafter described.

Figure 1:
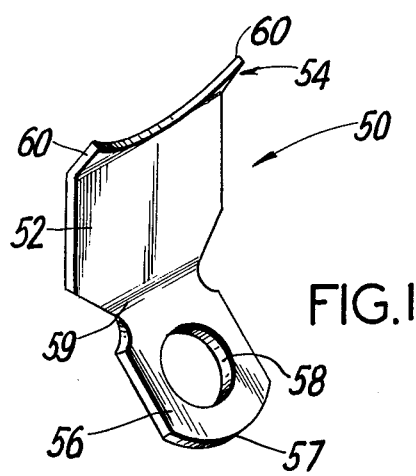
FIG. 1 is a perspective view of a quick-fastening clip member according to the present invention.

Referring now to FIG. 1, there is illustrated threaded fastener quick-fastener means (shown as clip member 50) which is particularly useful for achieving the objects and advantages of the present invention. Clip member 50, which is adapted to be slidably lockably engaged in slotted channel 26 for quick-fastening of threaded fastener 15, comprises a generally V-shaped clip member consisting of a first leg member 52 united with second leg member 56, at vertex 59, to form an obtuse angle therebetween. Advantageously, first leg member 52 is adapted to be slidably lockably received in slots 30, and, to this end, includes detent means 54 adapted to be lockably embedded in slots 30. Detent means 54 may be formed by bending all or a part of the back end of first leg member 52 so as to form a rearwardly inclined angular projection for engaging slots 30. Also advantageously, second leg portion 56 is formed with aperture 58 for engaging threaded fastener 15. As preferably embodied, clip member 50 is made of a substantially rigid but resilient material such as spring steel.

During assembly, fastening clip 50 is installed in slotted channel 26 by inserting first leg portion 52 into slot means 30 in the opening thereof generally at backwall 14 with free end 57 of second leg member 56 as the leading edge. The clip is forced into slot 30 until vertex 59, formed at the junction of leg members 52 and 56, is seated in generally abutting relation with rear face 23 of boss 22. Essentially simultaneously, detent means 54 on leg member 52 is essentially permanently embedded in slots 30.

Advantageously, clip member 50 is proportioned such that when it is lockably engaged in slot means 30, aperture 58 is substantially in registration with borehole 24 and the orientation of second leg member 56 generates a projected cross-sectional area of aperture 58, as projected in a plane perpendicular to the axis of borehole 24, having a dimension between the two cross-sectional areas of threaded fastener 15 - one defined by the crests of the threaded fastener and the other by the roots thereof.

In operation, threaded fastener 15 may thus be inserted into borehole 24 until it engages two generally opposed edges of aperture 58. Since the projected area of aperture 58 is smaller than that projected by the crests of threaded fastener 15, further axial insertion of the threaded fastener is resisted by second leg member 56. However, by concentrating the force of inward insertion acting on fastener 15, such as by the use of a screwdriver, second leg member 56 may be deflected inwardly such that the projected area of aperture 58 is increased to a dimension essentially equal to the cross-sectional area of the fastener, allowing the thread crests in contact with aperture 58 to pass therethrough, enabling further axial insertion of fastener 15 in a ratchet-like manner. Thereafter, threaded fastener 15 may be screwed a few more turns for complete and secure mounting to box 10.

Advantageously, boss means 20 may include canopy 32 over the portion of channel 26 adjacent lug 22, essentially continuous with sidewall 12, with stop means 34 formed thereon to restrict rearward displacement of second leg 56 after clip 50 is fully seated in slot means 30. Stop means 34 may be formed by any convenient means, or it may be simply "punched" into the canopy by a suitable die stamp or the like after the box is molded. Accordingly, stop means 34 may be proportioned to allow essentially unobstructed insertion of clip member 50 into slotted channel 26 for seating clip 50 in abutting relation with lug 22, but prohibit over-excursion - i.e., the distance of bending back - of free end 57 of second leg member 56 essentially beyond the elastic limit of clip 50 during the insertion of threaded fastener 15. However, it will be understood that stop means 34 is preferably "punched" into the canopy after clip 50 has been fully seated in slots 30 in order to minimize dimensional tolerances required for achieving all the advantages discussed herein. Thus, stop means 34 need not be subject to such dimensioning as would allow unobstructed insertion of clip 50 into channel 26 while preventing over-excursion after assembly. In addition, clip 50 may be installed in channel 26 at the factory, followed by "punching in" stop 34, to eliminate the need for the ultimate user to perform that step.

Figure 3B:
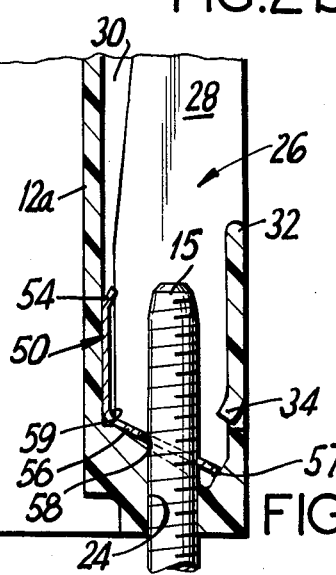
FIG. 3b is a cut-away view of the embodiment shown in FIG. 3a, including an inserted threaded fastener.
Figure 3C:
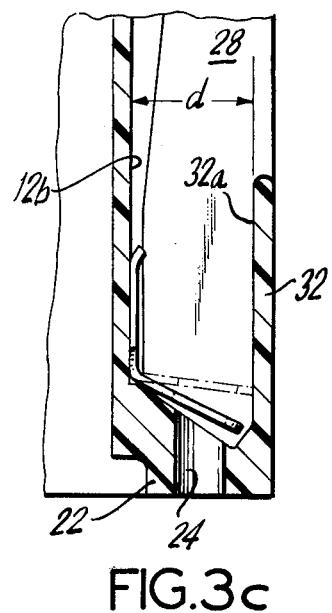
FIG. 3c is a cut-away view of another embodiment of boss means according to the present invention.
Figure 3D:
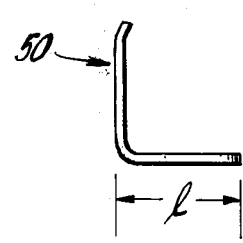
FIG. 3d is a side view of a clip member illustrating maximum excursion.

As preferably embodied, stop means 34 is positioned to prevent second leg 56 from being bent beyond an orientation essentially perpendicular to the axis of fastener 15, as indicated in FIG. 3d. Accordingly, clip member 50 cannot be irreparably distorted during the insertion of threaded fastener 15, which would otherwise render clip 50, and, for that matter, outlet box 10 since clip 50 is lockably secured therein, completely useless.

Alternatively, canopy 32 may simply be located relative to bottom portion 12a to act as the stop means without requiring an additional structure such as stop means 34. Accordingly, inside wall 32a of canopy 32 may be positioned a distance d (shown in FIG. 3c) from outer surface 12b of bottom portion 12a, which is less than the length of leg 56 when deflected to form a right angle with leg 52, as indicated by length l shown in FIG. 3d. Thus, when second leg 56 is deflected during the insertion of fastener 15, it will engage inner wall 32a such that over excursion of free end 57 will be prohibited, as shown in phantom in FIG. 3c.

According to another aspect of the present invention, slot means 30 are tapered in their height from a relatively large dimension at the back end of channel 26 to a narrower height near lug 22 for engaging and bearing against detent means 54. First leg portion 52 of clip member 50 may thus be inserted into slot means 30 substantially without engagement between detent means 54 and slots 30, such that clip member 50 is essentially freely slidable therein, until it approaches its fully seated position abutting the back face of lug 22. Accordingly, if clip 50 were improperly inserted into slot means 30, it may be easily removed therefrom without damaging the slots. Moreover, the tapering acts to guide clip member 50 for insuring that clip 50 attains its desired seating for accurate alignment of aperture 58 with borehole 24.

Referring now to FIG. 3b, there is shown a preferred embodiment of the tapered slots 30. According to this embodiment, the height of slot 30 attains its minimum dimension at a point generally rearward of both the back face of lug 22 and the location of detent means 54 when clip member 50 is fully seated adjacent the rear face of lug 22. Such structure ensures that detent means 54 are engaged within the narrowest portion of slot means 30 to bear against and "bite" into the moldable plastic material for providing reliable and essentially permanent lockable engagement of clip 50 in slots 30.

In conjunction with this aspect of the present invention, detent means 54 formed on first leg portion 52 may advantageously comprise two rearwardly inclined barbs 60 extending angularly outwardly from the flat surface of first leg member 52, which offer minimum resistance to insertion in slot means 30 yet resist removal under the force of axial insertion applied to threaded fastener. Barbs 60 may conveniently be formed by bending each corner of the back edge of first leg 52 so as to provide at least two rearwardly inclined angular projections from the surface of second leg portion 52. As preferably embodied, the back edge of first leg portion 52 may be formed with acute angular pointed corners, such as by fabricating the back end of first leg 52 with a convex edge. Thus, when barbs 60 are formed by bending such corners, or bending the back edge of leg 52 as shown in FIG. 1, the barbs are provided with sharp tips for "biting" into the plastic material of slots 30 but are rearwardly inclined so as not to interfere with installation.

According to another aspect of the present invention, second leg portion 56 is formed to a smaller width than that between sidewall portions 28 of channel 26. This is particularly useful for allowing substantially freely slidable insertion of clip member 50 into slotted channel 26 (except, of course, for for the engagement of detent means 54 with slots 30), since the edges of second leg portion cannot make contact with sidewall portions 28 to interfere with installation of clip member 50 in slotted channel 26.

Advantageously, clip member 50 may also be provided with generally symmetrical indentation, in the edges thereof, about vertex 59 in order to substantially eliminate possible formation of a protruding edge or corner on either leg member during fabrication of clip member 50. Such an edge might otherwise be formed when the pre-assembled clip member is bent at vertex 59, and interfere with installation of clip member 50 in slotted channel 26. Such indentation is also useful for facilitating installation of clip member 50 where slot 30 may be formed by line protrusions formed onto sidewall portions 28 of slotted channel 26, instead of slots of enlarged width as illustrated in FIGS. 2a and b. However, slot means 30 formed as indentations of enlarged width molded into sidewall portions 28 are particularly advantageous inasmuch as a substantially rigid structure is thereby provided - i.e. sidewall portions 28 - against which detent means 54 of clip member 50 may bear for secure, reliable and essentially permanent engagement with slot means 30.

According to another aspect of the present invention, the back face 23 of lug 22 is formed at an angular slant with respect to the axis of borehole 24 to provide abutting means of substantial strength for seating clip member 50. Advantageously, the slant provided back face 23 is slightly non-parallel to the orientation of second leg portion 56 such that when clip 50 is seated in slots 30, vertex 59 is essentially the only portion of clip 50 which makes contact with lug 22, and aperture 58 is spaced from lug 22. Thus, when threaded fastener 15 is engaged by the edges of aperture 58 and tightened so as to bear firmly against the front of lug 22, second leg portion 56 is brought substantially in contact with back face 23 of lug 22, decreasing the aforesaid projected area of aperture 58 whereby the contacted edges of aperture 58 engage fastener 15 deeper into the threads, closer to the roots thereof, to provide more secure retention of the fastener.

In a particularly useful embodiment of the present invention, the shank end of threaded fastener 15 may be slightly tapered and/or provided with a groove therein to facilitate initial threading of the fastener in engagement with the edges of aperture 58. This feature is especially useful in the event that clip member 50 is seated in slotted channel 26 with aperture 58 slightly off-centered with respect to borehole 24.

It will be readily appreciated that aspects of the present invention may be embodied in other than the embodiments illustrated in the accompanying drawings and described above. For example, channel 26 may extend from the back face of lug 22 to sidewall 12 rather than to backwall 14. Accordingly, slot means 30 may be provided at a shallow angle diverging from sidewall 12 or may be slightly curved. Also for example, slot means 30 may be formed by molding an essentially line projection on the sidewall portions of channel 26.

Thus, the invention in its broader aspects is not limited to the specific embodiments herein shown and described, but variations may be made therefrom within the scope of the accompanying claims, without departing from the principles of the invention and without sacrificing its chief advantages.

What is claimed is:

1. Threaded fastener mounting means, which comprises:
   a screw mounting member including a backwall and generally continuous sidewall means upstanding from said backwall, said sidewall means defining a generally open front face at its front edge opposite said backwall;
   boss means formed on at least one portion of said sidewall means, said boss means including:
      a lug formed essentially at said front end, said lug having an unthreaded borehole extending rearwardly from said front face for receiving a threaded fastener, and
      a slotted channel of relatively enlarged width behind said lug, into which said borehole opens, said channel including slot means;
   threaded fastener quick-fastening means slidably and lockably receivable in each said slotted channel, said quick-fastening means comprising a generally V-shaped clip member which includes:
      a first leg receivable in said slot means,
      a second leg forming a generally obtuse angle at the vertex of intersection with said first leg and having an aperture formed therein for receiving said threaded fastener, and
      detent means formed on said first leg for lockably securing said clip member in said slot means when said clip member is fully seated in said slot means substantially adjacent said back end of said lug;
   said clip member being lockably seated in place by said detent means, with said vertex substantially abutting said lug and said aperture essentially in registration with said borehole, said second leg being inclined with respect to the axis of said borehole such that when said threaded fastener is inserted into said borehole, said fastener engages two generally opposed edges of said aperture and said second leg yields slightly to permit inward axial movement of said threaded fastener in a ratchet-like manner but said two edges of said aperture wedge against projections of said threaded screw fastener to prevent outward axial movement of the fastener.

2. Threaded fastener mounting means according to claim 1 which further includes a canopy at least partially covering said slotted channel to provide an essentially continuous wall with said sidewall adjacent said boss means, said canopy adapted to provide stop means for substantially preventing excursion of said free end of said second leg beyond a predetermined point during insertion of said threaded fastener.

3. Threaded fastener mounting means according to claim 2 wherein said canopy is positioned to substantially prohibit excursion of said free end of said second leg beyond the predetermined point.

4. Threaded fastener mounting means according to claim 2 wherein the back face of said lug is formed with a generally rearward slant, said slant being slightly non-parallel to said second leg when said clip member is fully seated adjacent said lug such that, before insertion of said threaded fastener, said free end of said second leg and said aperture are spaced from said back face of said lug.

5. Threaded fastener mounting means according to claim 2 wherein said boss means are formed on generally opposed sidewall portions and said mounting means include two clip members.

6. Threaded fastener mounting means according to claim 5 wherein said screw mounting member is a generally rectangular electrical assembly box.

7. Threaded fastener mounting means according to claim 6 wherein said screw mounting member is a generally round electrical assembly box.

8. Threaded fastener mounting means according to claim 2 wherein said slotted channel extends from the back of said lug to said backwall.

9. Threaded fastener mounting means according to claim 8 wherein said boss means are formed on generally opposed sidewall portions and said mounting means include two clip members.

10. Threaded fastener mounting means according to claim 9 wherein said screw mounting member is a generally rectangular electrical assembly box.

11. Threaded fastener mounting means according to claim 10 wherein said screw mounting member is a generally round electrical assembly box.

12. Threaded fastener mounting means, which comprises:
- a screw mounting member including a backwall and generally continuous sidewall means upstanding from said backwall, said sidewall means defining a generally open front face at its front edge opposite said backwall;
- boss means formed on at least one portion of said sidewall means, said boss means including:
  - a lug formed essentially at said front end, said lug having an unthreaded borehole extending rearwardly from said front face for receiving a threaded fastener, and
  - a slotted channel of relatively enlarged width behind said lug, into which said borehole opens, said channel including slot means which generally taper from the end of said slotted channel opposite said lug to a point generally near said lug;
- threaded fastener quick-fastening means slidably and lockably receivable in each said slotted channel, said quick-fastening means comprising a generally V-shaped clip member which includes:
  - a first leg receivable in said slot means,
  - a second leg forming a generally obtuse angle at the vertex of intersection with said first leg and having an aperture formed therein for receiving said threaded fastener, and
  - detent means formed on said first leg, extending generally outwardly from said first leg, for becoming wedged within said slot means to lockably secure said
  - clip member in said slot means when said clip member is fully seated in said slot means substantially adjacent said back end of said lug;

said clip member being lockably seated in place by said detent means, with said vertex substantially abutting said lug and said aperture essentially in registration with said borehole, said second leg being inclined with respect to the axis of said borehole such that when said threaded fastener is inserted into said borehole, said fastener engages two generally opposed edges of said aperture and said second leg yields slightly to permit inward axial movement of said threaded fastener in a ratchet-like manner but said two edges of said aperture wedge against projections of said threaded screw fastener to prevent outward axial movement of the fastener.

13. Threaded fastener means according to claim 12 wherein said detent means are generally rearwardly inclined and extend angularly outwardly from said first leg and wherein said slot means comprise a pair of indentations of enlarged width formed in sidewall portions of said channel and wherein said second leg of said clip member has a narrower width than that of said first leg such that said width of said first leg is greater than the width of said channel to engage said slot indentations and the width of said second leg is less than the width of said channel.

14. Threaded fastener mounting means according to claim 13 wherein said clip member is formed with two generally symmetrical indentations at said vertex.

15. Threaded fastener mounting means according to claim 13, wherein said detent means are formed by bending two corners at the back edge of said first leg to generate two barbs for projecting into the material of said slot means when said clip member is fully seated in said slotted channel.

16. Threaded fastener mounting means according to claim 15, wherein said corners of said back edge of said first leg are formed to less than 90° to provide relatively sharp barbs.

17. Threaded fastener mounting means according to claim 16 wherein said back edge of said first leg is bent along a fold line essentially perpendicular to its side edges and substantially near said back edge.

18. Threaded fastener mounting means according to claim 13 wherein said boss means are formed on generally opposed sidewall portions and said mounting means include two clip members.

19. Threaded fastener mounting means according to claim 18 wherein said screw mounting member is a generally rectangular electrical assembly box.

20. Threaded fastener mounting means according to claim 19 wherein said screw mounting member is a generally round electrical assembly box.

21. Threaded fastener mounting means, which comprises:
- a screw mounting member including a backwall and generally continuous sidewall means upstanding from said backwall, said sidewall means defining a generally open front face at its front edge opposite said backwall;
- boss means formed on at least one portion of said sidewall means, said boss means including:
  - a lug formed essentially at said front end, said lug having an unthreaded borehole extending rearwardly from said front face for receiving a threaded fastener, and a slotted channel of relatively enlarged width behind said lug, into which said borehole opens, said channel including slot means;

threaded fastener quick-fastening means slidably and lockably receivable in each said slotted channel, said quick-fastening means comprising a generally V-shaped clip member which includes:

a first leg receivable in said slot means, a second leg forming a generally obtuse angle at the vertex of intersection with said first leg and having an aperture formed therein for receiving said threaded fastener, and detent means formed on said first leg for lockably securing said clip member in said slot means when said clip member is fully seated in said slot means substantially adjacent said back end of said lug;

a canopy at least partially covering said slotted channel to provide an essentially continuous wall with said sidewall adjacent said boss means; and stop means formed on said canopy, said stop means projecting into said channel slightly behind the free end of said second leg when said clip member is fully seated generally adjacent said lug and proportioned to prevent excursion of the free end of said second leg rearwardly of said stop means, said clip member being lockably seated in place by said detent means, with said vertex substantially abutting said lug and said aperture essentially in registration with said borehole, said second leg being inclined with respect to the axis of said borehole such that when said threaded fastener is inserted into said borehole, said fastener engages two generally opposed edges of said aperture and said second leg yields slightly to inward axial movement of said threaded fastener in a ratchet-like manner but said two edges of said aperture wedge against projections of said threaded screw fastener to prevent outward axial movement of the fastener, said second leg not yielding farther back than said stop means.

22. Threaded fastener mounting means according to claim 21 wherein said detent means extend outwardly from said first leg and said slot means are tapered from a relatively large detent engaging dimension at the end of said slotted channel opposite said lug to a final detent engaging dimension generally near said lug for engaging said first leg and bearing against said detent means such that said detent means are substantially lockably engaged within said slot means when said clip member is fully seated adjacent said lug.

23. Threaded fastener mounting means according to claim 22 wherein said detent means are generally rearwardly inclined and extend angularly outwardly from said first leg and wherein said slot means comprise a pair of indentations of enlarged width formed in sidewall portions of said channel and wherein said second leg of said clip member has a narrower width than that of said first leg such that said width of said first leg is greater than the width of said channel to engage said slot indentations and the width of said second leg is less than the width of said channel.

24. Threaded fastener mounting means according to claim 23 wherein said detent means are formed by bending two corners at the back edge of said first leg to generate two barbs for projecting into the material of said slot means when said clip member is fully seated in said slotted channel.

25. Threaded fastener mounting means according to claim 24 wherein said corners of said back edge of said first leg are formed to less than 90° to provide relatively sharp barbs.

26. Threaded fastener mounting means according to claim 21 wherein said stop means is proportioned to allow insertion of said clip member in said slotted channel to its fully seated position adjacent said lug.

27. Threaded fastener mounting means according to claim 26 wherein said detent means extend outwardly from said first leg and said slot means are tapered from a relatively large detent engaging dimension at the end of said slotted channel opposite said lug to a final detent engaging dimension generally near said lug for engaging said first leg and bearing against said detent means such that said detent means are substantially lockably engaged within said slot means when said clip member is fully seated adjacent said lug.

28. Threaded fastener mounting means according to claim 27 wherein said detent means are generally rearwardly inclined and extend angularly outwardly from said first leg and wherein said slot means comprise a pair of indentations of enlarged width formed in sidewall portions of said channel and wherein said second leg of said clip member has a narrower width than that of said first leg such that said width of said first leg is greater than the width of said channel to engage said slot indentations and the width of said second leg is less than the width of said channel.

29. Threaded fastener mounting means according to claim 28 wherein said detent means are formed by bending two corners at the back edge of said first leg to generate two barbs for projecting into the material of said slot means when said clip member is fully seated in said slotted channel.

30. Threaded fastener mounting means according to claim 29 wherein said corners of said back edge of said first leg are formed to less than 90° to provide relatively sharp barbs.

31. Threaded fastener mounting means according to claim 21 wherein said boss means are formed on generally opposed sidewall portions and said mounting means include two clip members.

32. Threaded fastener mounting means according to claim 31 wherein said screw mounting member is a generally rectangular electrical assembly box.

33. Threaded fastener mounting means according to claim 32 wherein said screw mounting member is a generally round electrical assembly box.

34. Threaded fastener mounting means, which comprises:

a screw mounting member including a backwall and generally continuous sidewall means upstanding from said backwall, said sidewall means defining a generally open front face at its front edge opposite said backwall;

boss means formed on at least one portion of said sidewall means, said boss means including:

a lug formed essentially at said front end, said lug having an unthreaded borehole extending rearwardly from said front face for receiving a threaded fastener, and a slotted channel of relatively enlarged width behind said lug, into which said borehole opens, said channel including slot means which generally taper from the end of said slotted channel opposite said lug to a point generally near said lug;

threaded fastener quick-fastening means slidably and lockably receivable in each said slotted channel, said quick-fastening means comprising a generally V-shaped clip member which includes:
- a first leg receivable in said slot means,
- a second leg forming a generally obtuse angle at the vertex of intersection with said first leg and having an aperture formed therein for receiving said threaded fastener, and
- detent means formed on said first leg, extending generally outwardly from said first leg, for becoming wedged within said slot means to lockably secure said clip member in said slot means when said clip member is fully seated in said slot means substantially adjacent said back end of said lug; and a canopy at least partially covering said slotted channel to provide an essentially continuous wall with said sidewall adjacent said boss means, said canopy is positioned to substantially prohibit excursion of the free end of said second leg beyond a predetermined point, said clip member being lockably seated in place by said detent means, with said vertex substantially abutting said lug and said aperture essentially in registration with said borehole, said second leg being inclined with respect to the axis of said borehole such that when said threaded fastener is inserted into said borehole, said fastener engages two generally opposed edges of said aperture and said second leg yields slightly to permit inward axial movement of said threaded fastener in a ratchet-like manner but said two edges of said aperture wedge against projections of said threaded screw fastener to prevent outward axial movement of the fastener, said second leg not yielding farther back than the predetermined point.

35. Threaded fastener mounting means according to claim 34 wherein said detent means are generally rearwardly inclined and extend angularly outwardly from said first leg and wherein said slot means comprise a pair of indentations of enlarged width formed in sidewall portions of said channel and wherein said second leg of said clip member has a narrower width than that of said first leg such that said width of said first leg is greater than the width of said channel to engage said slot indentations and the width of said second leg is less than the width of said channel.

36. Threaded fastener mounting means according to claim 5 wherein said detent means are formed by bending two corners at the back edge of said first leg to generate two barbs for projecting into the material of said slot means when said clip member is fully seated in said slotted channel.

37. Threaded fastener mounting means according to claim 26 wherein said boss means are formed on generally opposed sidewall portions and said mounting means include two clip members.

38. Threaded fastener mounting means according to claim 37 wherein said screw mounting member is a generally rectangular electrical assembly box.

39. Threaded fastener mounting means according to claim 38 wherein said screw mounting member is a generally round electrical assembly box.

40. Threaded fastener mounting means according to claim 36 wherein said corners of said back edge of said first leg are formed to less than 90° to provide relatively sharp barbs.

* * * * *

UNITED STATES PATENT OFFICE
CERTIFICATE OF CORRECTION

Patent No. 4,069,448                    Dated January 17, 1978

Inventor(s) Paul D. Gernhardt

It is certified that error appears in the above-identified patent and that said Letters Patent are hereby corrected as shown below:

IN THE SPECIFICATION:

In Column 7, line 19, delete "for" before the word "the";
In Column 7, line 26, "indentation" should be --indentations--.

IN THE CLAIMS:

In Claim 11, line 2, "10" should be --9--;
In Claim 20, line 2, "19" should be --18--;
In Claim 33, line 2, "32" should be --31--;
In Claim 36, line 2, "5" should be --35--;
In Claim 37, line 2, "26" should be --36--;
In Claim 39, line 2, "38" should be --37--.

Signed and Sealed this

Thirty-first Day of October 1978

[SEAL]

Attest:

RUTH C. MASON
*Attesting Officer*

DONALD W. BANNER
*Commissioner of Patents and Trademarks*